INVENTOR
OTTO REIMANN

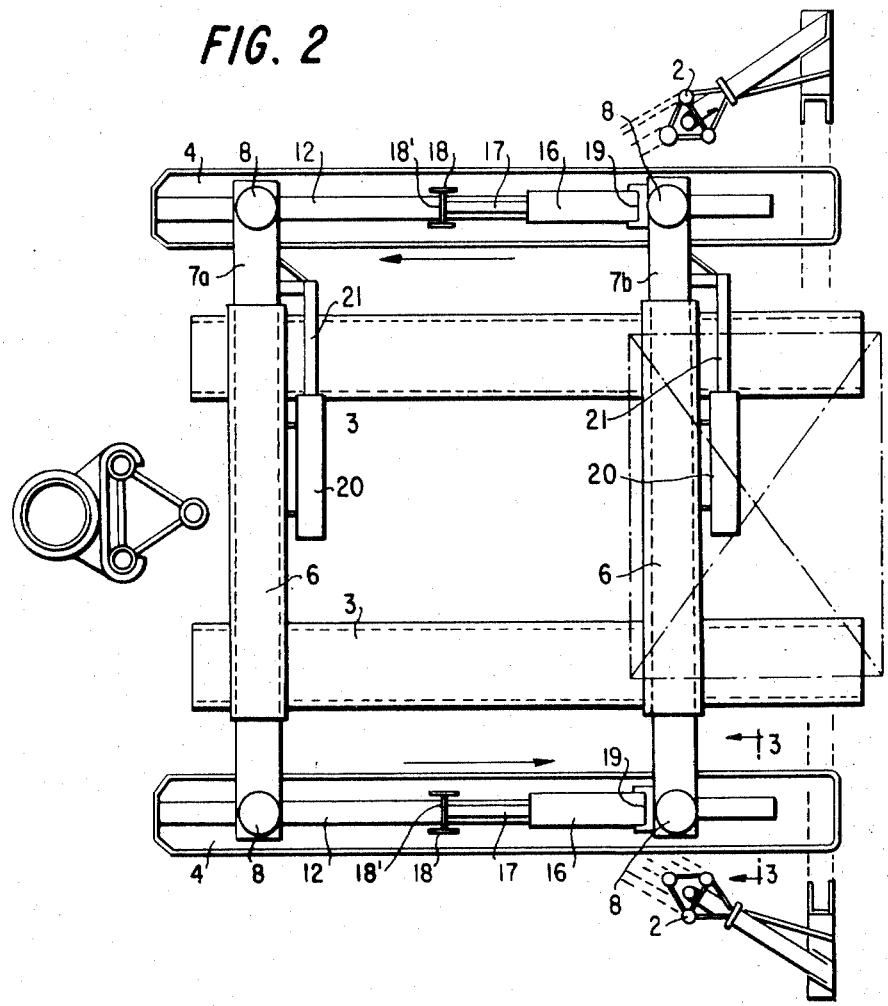
FIG. 2
FIG. 3
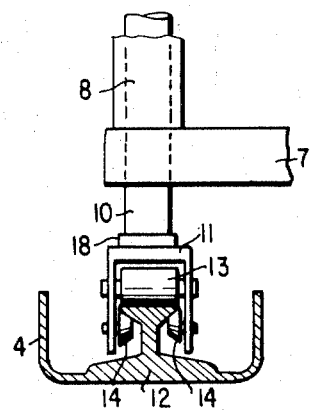
INVENTOR
OTTO REIMANN
BY *Otto Reimann*
ATTORNEY

Sept. 8, 1970 O. REIMANN 3,527,313
APPARATUS FOR WALKING GROUND-WORKING MACHINERY
Filed Aug. 1, 1967 5 Sheets-Sheet 5

INVENTOR
OTTO REIMANN

United States Patent Office 3,527,313
Patented Sept. 8, 1970

3,527,313
APPARATUS FOR WALKING GROUND-WORKING MACHINERY
Otto Reimann, 18 Kaiserstrasse, 29 Oldenburg, Germany
Filed Aug. 1, 1967, Ser. No. 657,482
Claims priority, application Germany, Aug. 1, 1966,
R 43,810
Int. Cl. B62d 57/02
U.S. Cl. 180—8                                    12 Claims

ABSTRACT OF THE DISCLOSURE

An apparatus for walking machinery working adjacent to the ground, such as machinery handling or moving earth and construction materials, a steam shovel, pile driver, drill, concrete vibrator, excavator, mud suction machinery and similar equipment, having a platform positioned on or above the ground including uneven ground, snow covered ground or muddy surface, receiving, loading and unloading the machinery with means to raise and lower the platform, means to hold the machinery on the platform in a stationary operable position, means to walk the platform stepwise in all directions in one or more planes horizontal or at angles thereto parallel or not, forward, rearward and sideways, means to rotate the platform and means to control the movements of the platform manually, automatically, without and with program controls and without and/or with timing controls.

---

The present application claims the convention priority date of Aug. 1, 1966, of a corresponding German patent application No. R 43,810.

FIELD OF THE INVENTION

A platform mounted on two sets of shoes, skids or runners, one stationary, and one stepping provided with walking movements, displaceable with guide rails, positioned on the upper side, transverse bearing guides mounted perpendicularly to the stationary skids with crossbearing members, one for each guide, a lifting cylinder for each, having a piston rod slidable downwardly out of the piston, equipped with guide rollers guided at the rails of the stepping skids. Shifting cylinders are hingedly connected to the working machinery and the piston rods have an articulated, jointed connection with the stepping skids.

SUMMARY OF THE INVENTION

The objects of the invention are:

To provide a construction that has few movable parts and thus a low weight.

To utilize simple structural elements, such as mass-produced hydraulic lifting cylinders, valves, rollers, and sliding or guide rails which are readily available in commerce.

To provide a construction which guides the lower ends of the pistons of the pressure medium cylinders simultaneously by means of rollers at the guide rails of the step or advancing skids for purposes of lifting the step or advance mechanism.

To provide step or advance mechanisms with a high degree of stability even during the advancing movement of the platform which is greater than that of the advance mechanisms of the prior art in which a centrally-positioned rotary table is used that may be set down on the ground.

To provide the platform with an advancing mechanism adapted to move laterally upon or by means of a lateral displacement of the transverse or cross bearer members in the transverse bearer guides from the standing position without rotary movement during ramming.

To provide a considerably simplified operation when for example piling boards along a wall are rammed in.

To provide the advance mechanism with means to execute a rotary movement in that the step or advance skids are moved simultaneously in opposite directions while at that time, the hydraulic drives are being coordinated to each step skid or runner and are reversed accordingly.

In an alternative embodiment to provide:

In the place of a single lateral step or advance skid or runner each to laterally have a set of two step skids each whose hydraulic advance drives operate independently of each other and as a result thereof, thus to double the advance speed.

To make the stationary skids a supporting part of the frame of the apparatus; furthermore, to adapt the stationary skids to be extended forwardly by attaching thereto elongating members so that a watercourse, for example, may be bridged with the aid of the stationary skids or runners.

To provide reinforcing braces for and extend from the elongating members to the supporting frame to which the frame-leaders are secured at the bottom.

To provide the individual skids or runners with base plates so that the equipment may operate in the horizontal position when work is being carried out on inclines or embankments.

To attach vertically downwardly-directed supporting bases to the front ends of the skids.

DESCRIPTION OF THE PREFERRED EMBODIMENTS

According to a preferred embodiment of the present invention, wheel sets may be disposed at the front end and at the rear of the implement so that the latter may be adapted to be movable for the transport from one place of operation to the next. In this case, it is possible, with the aid of the shifting cylinders which act upon the step skids, to pull the wheel sets toward the implement while the latter is simultaneously being lifted.

One embodiment of the present invention from which further inventive features and characteristics will become apparent is illustrated in the accompanying drawing, wherein:

FIG. 2 is a top plan view of the step or advance mechanism of the rammer or pile driver according to FIG. 1;

FIG. 3 is a cross-sectional view taken along line III—III in FIG. 2;

Figure 1:
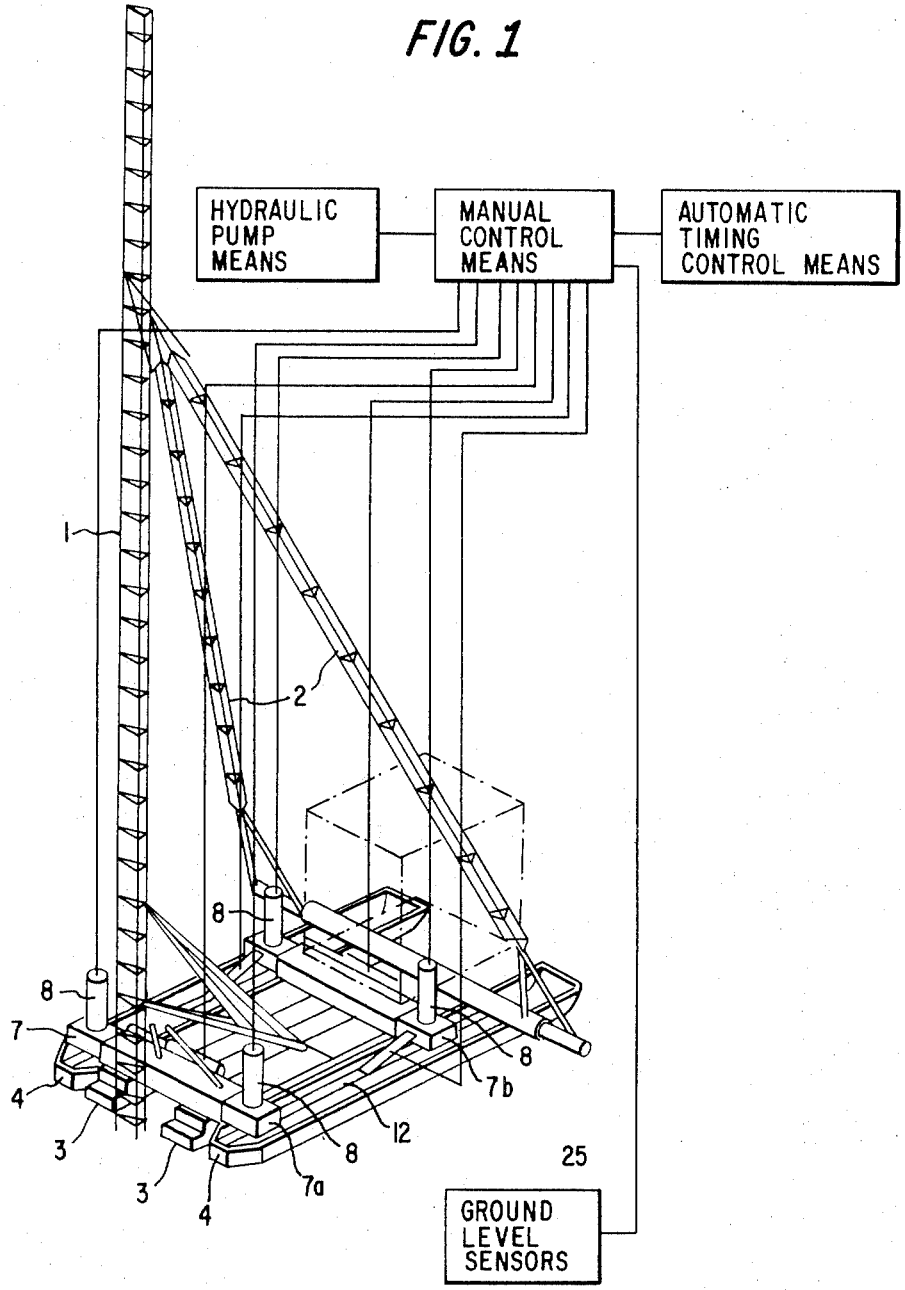
FIG. 1 is a perspective view of a rammer or pile driver equipped with the step or advance mechanism proposed by the present invention.
Figure 4:
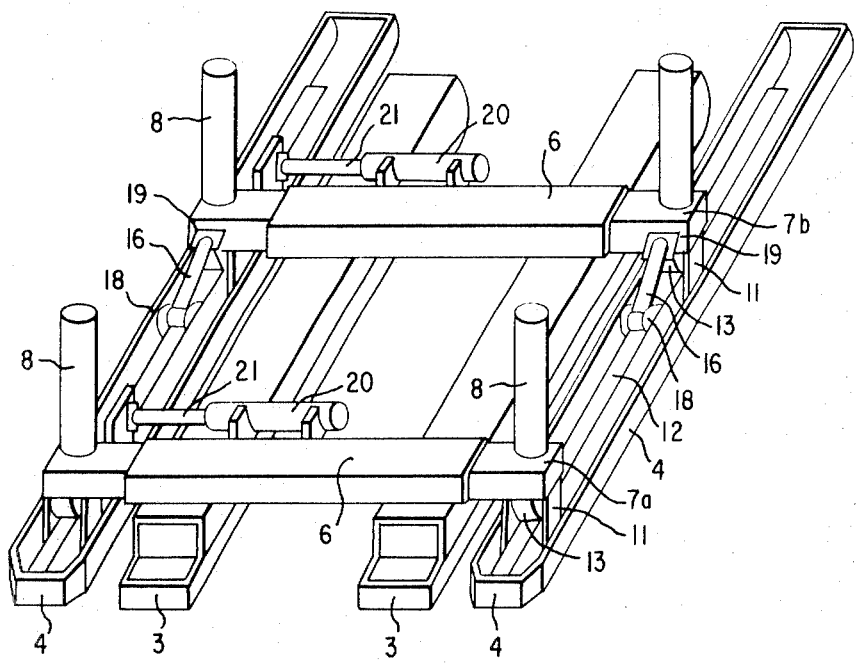
FIG. 4 is a front elevational view in perspective of the rammer or pile driver according to FIGS. 1 and 2.
Figure 5:
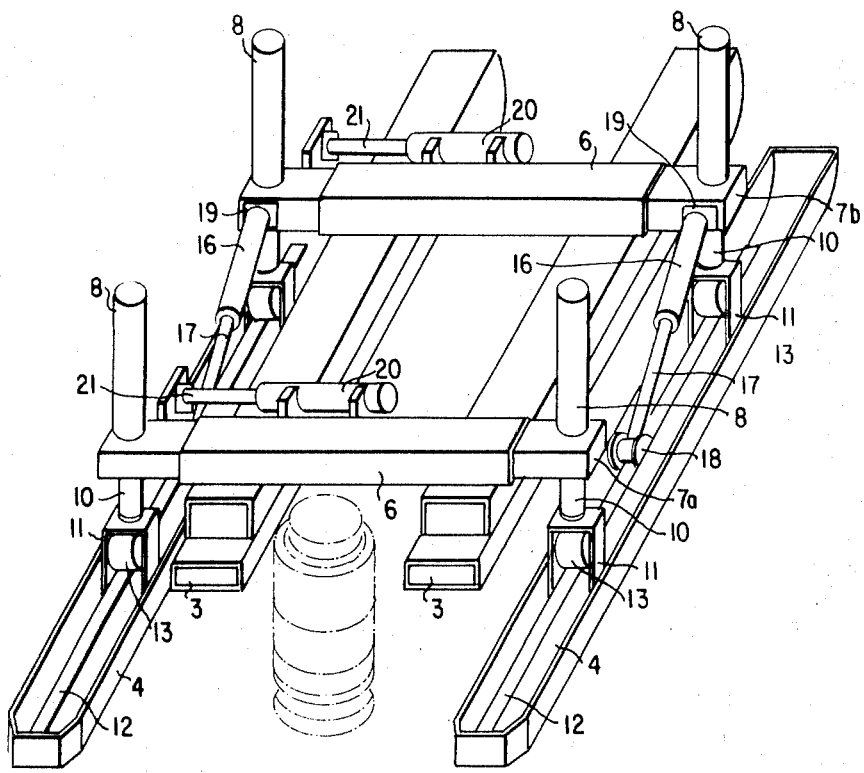
FIG. 5 is a view according to FIG. 4 with downwardly extended step or advance skids or runners.

FIG. 1 is a lateral view of a rammer or pile driver comprising frame-leaders 1 supported rearwardly by means of supporting braces 2. The frame-leaders and the supporting braces are secured to the basic framework of the rammer or pile driver which includes two stationary skids or runners 3 extending parallelly with respect to each other in the longitudinal direction at the underside of the rammer as shown in FIG. 2. The stationary skids or runners are connected with one another also by means of two hollow box-shaped transverse bearer guides 6 extending transversely across the stationary skids. In each transverse bearer guide, one box-shaped transverse bearer member 7a and 7b is displaceably positioned and, at the ends thereof projecting to both sides, is provided with one vertical lifting cylinder 8 each. The piston rods 10 protruding downwardly from the lifting cylinders are connected by means of rollers 13 to two step or advance skids or runners 4 which, being positioned parallel with respect to each other, are disposed on the outside and adjacent the stationary skids 3. As is evident particularly from FIG. 3, a longitudinally-extending rail 12 is secured within each of the tub-shaped or trough-like stepping or advance skids 4. The two coordinated piston rods 10 of the lifting cylinders 8 are connected with the rail and horizontally displaceable by means of roller guides 13 and 14 and rotatable about the lifting cylinder axis. Each roller guide includes a downwardly open U-shaped bracket 11 which is secured to the piston rod and in which there is positioned a roller 13 which runs on the rail. The flanges of the bracket 11 further supports inwardly-disposed rollers 14 which enclose the rail profile or section on both sides thereof.

Shifting cylinders 16, each being hydraulically actuated in the embodiment shown herein and hingedly connected to the projecting ends of the rearward transverse bearer member 7b above the rails 12, and its piston rod 17 is connected by a universal joint connection 18' with an articulated support 18 which is secured to the rail 12 between the two transverse bearer members 7. The shifting cylinders are connected over universal joints to the transverse bearer members 7b within U-shaped hinged supports 19 so that they are pivotable both in the vertical and in the horizontal plane. The hinged supports 18 are adapted to be displaced or shifted on the rails 12 so that as a result the stepping or advancing skids may either be more forwardly or more rearwardly disposed as compared to the stationary skids.

Figure 6:
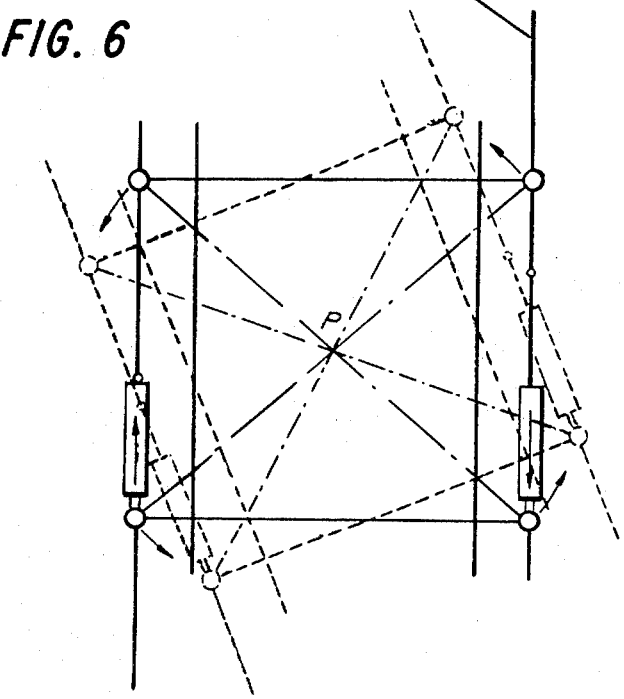
FIG. 6 is a schematic diagram illustrating a first mode of turning the apparatus.
Figure 7:
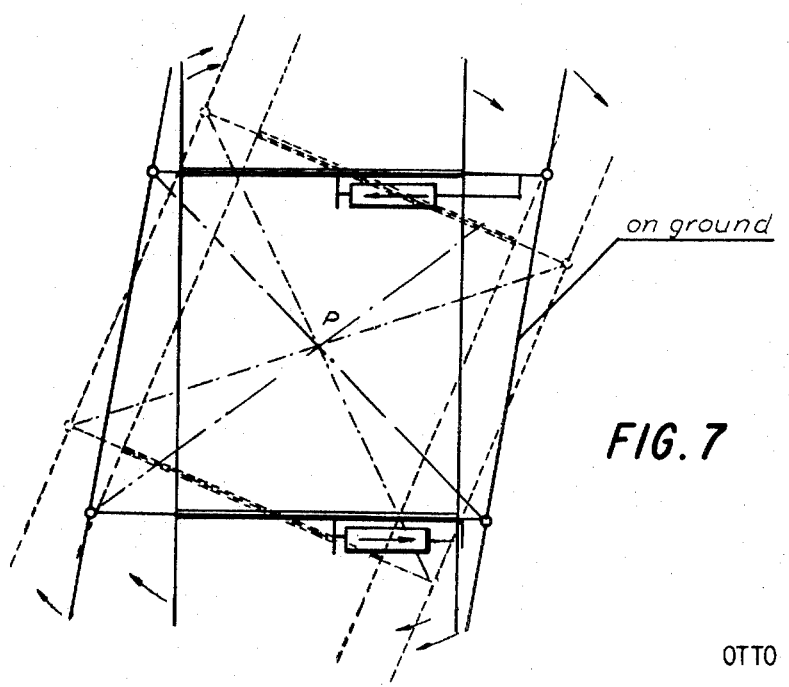
FIG. 7 is a schematic diagram illustrating a second mode of turning the apparatus.

In the embodiment shown herein, the lifting cylinders 8 and the shifting cylinders 16 and 20 are provided as hydraulic cylinders. In the normal stationary operating positions, the apparatus is positioned on two stationary skids 3 and the stepping or advancing skids 4 may be lowered so as to serve as an additional lateral support. When it is intended to move the implement forwardly, the stepping skids are initially lifted with the aid of the lifting cylinders, are then forwardly extended in the horizontal plane with the aid of the shifting cylinders 16 and placed again on the ground with the lifting cylinders. By further extending the piston rods of the lifting cylinders, the implement with the stationary skids is lifted off the ground and displaced forwardly on the rails 12 of the stepping skids with the aid of the shifting cylinders 16 and is then set down again on the ground. For lateral movement, the raised stepping skids are initially displaced laterally with the aid of the shifting cylinders 20 by displacing the transverse bearer members 7a 7b and thereupon lowered down to the ground. Thereafter, the implement is raised by further extending the piston rods 10 and, while being suspended in this phase at the transverse or cross bearer members, it is displaced laterally on the cross bearer members and set down again on the ground with the stationary skids. During the rotary movement, and with the stationary skids 3 being preferably lifted off the ground, the stepping or advancing skids 4 are displaced in a mutually opposite sense forwardly and, respectively, rearwardly so that the machinery will turn as a result of the torque being produced as shown by arrows in FIGS. 2 and 6 and so that the stepping skids will execute a sliding rotary movement. Turning on the spot may also be accomplished by an alternate mode, by using only the action of the shifting cylinders 20 (FIG. 7). The latter are operated in opposite directions, so as to swing the stepping skids 4 into an angular position, following which the stepping skids are lowered to lift the rammer off the ground. The cylinders 20 are then operated in reverse and the lifted rammer executes a partial turn, while the stepping skids 4 perform a small sliding-rotating movement.

It is also possible to combine the two modes of turning by operating both pairs of shifting cylinders 16 and 20 in combination. Such a combination mode is particularly advantageous for operation on soft ground.

In the embodiment shown, the hydraulically-actuated lifting cylinders positioned at the forward cross bearer member and at the rearward cross bearer member are united or combined in pairs with respect to the drive thereof. Preferably, the hydraulic connection or control means are chosen in such a manner that all four of the lifting cylinders are synchronized and, alternatively that each individual lifting cylinder is actuated separately. In addition the hydraulic action upon the individual lifting and shifting cylinders preferably includes means permitting operation of some of the hydraulic cylinders while others already stopped against the firm ground because of its ruggedness, unevenness or firmness within the coordinated range of the stepping skids. Thus the hydraulic cylinders operate until both sets of skids firmly rest against the uneven ground. For this purpose conventional individual valve means may be included in the hydraulic system, which operate variably in response to the variable pressure encountered by the resistance of the ground upon the ends of each skid. In addition or in substitution thereof, ground level sensors are attached, one for the valving system of each cylinder controlling the vertical displacements of the skids to close or keep them open independently of the others. The ground level sensors shown in FIG. 1 are for instance preloaded platforms spaced under the skids which, on compression, close the valve of the corresponding cylinders 8.

An analogous arrangement applies also to the stationary skids.

The operating procedures for the hydraulic unit which are necessary for executing the individual stepping and, respectively, rotary movements may also be readily accomplished in an automatic manner. For example scanning devices, mechanical switchgears, electrical storage devices, punch cards, and the like may be included in a conventional manner to control the walking steps. To increase the stability of the machinery, the latter may be provided with supports which can be laterally positioned on the ground. Such supports may be placed, for instance, at the outer points of the two cross bearer members 6 in such a manner that the additional support or bracing is positioned outside of the lateral range of movement of the stepping or advancing skids.

The definition "platform" for claims purposes includes working machinery built integrally therewith.

It should be understood of course that the foregoing disclosure relates to only preferred embodiments of the invention and that it is intended to cover all changes and modifications of the examples of the invention chosen for the purposes of the disclosure, which do not constitute departures from the spirit and scope of the invention set forth in the appended claims.

I claim:
1. An apparatus for walking ground-working machinery, such as earth moving equipment, a steam shovel, pile driver, drill, vibrator, excavator and construction and assembly material advancing machinery, comprising:
   (a) a working-machinery receiving and holding platform;
   (b) means to raise and lower said platform from and into a stationary operation-ready position;
   (c) means to walk said platform rearwards and forwards;
   (d) means to walk said platform sideways; and
   (e) means to rotate said platform; said platform comprising stationary skid means; said means to walk said platform sideways comprising cross bearer guide means mounted in parallel, transverse alignment on said stationary skid means fixedly relative thereto, cross bearer means mounted displaceably in said cross bearer guide means, stepping skid means mounted to said cross bearer means fixedly relative to movement thereof in the sideways direction, first fluid pressure means (8, 10) connected between said platform and said stepping skid means and having a portion thereof movable upwards and downwards to move said stepping skid means above and below the level of said stationary skid means, and a second fluid pressure means to produce relative sideways movement between said stationary skid means and said stepping skid means.

2. An apparatus as claimed in claim 1, said stepping skid means further comprising a rail (12) fixedly mounted thereon, said means to walk said platform rearwards and forwards comprising third fluid pressure means, said third fluid pressure means (16) positioned above said rail (12) and connected in a universally jointed manner to projecting ends of one cross bearer means (7b) and wherein, within the region between the two cross bearer members (7a, 7b), the piston rod (17) thereof being in operative engagement with a pivot support (18) secured to the rail (12).

3. An apparatus as claimed in claim 2, said means to produce relative forwards and backwards movement comprising a roller connection (13, 14) between said first fluid pressure means and said rail (12) for lifting and lowering of said stepping skid means, said third fluid pressure means including means to move said stepping skid means horizontally relative to said stationary skid means across said roller connection.

4. An apparatus as claimed in claim 2 wherein said pivot support (18) is adapted to be displaced on the rails (12).

5. An apparatus as claimed in claim 1, said stationary skid means comprising at least two stationary skids (3) being disposed parallel with respect to each other and said stepping skid means comprising at least two stepping skids (4) movable above and below the level of said stationary skids, at least one of said stepping skids (4) being disposed on each side of said stationary skids.

6. An apparatus as claimed in claim 5, said means to rotate comprising means to move said stepping skids (4) longitudinally parallelly in opposite directions with respect to each other.

7. An apparatus as claimed in claim 5, said means to rotate comprising means to swing said stepping skids (4) sideways parallelly to each other to form a horizontal angle with said stationary skids.

8. An apparatus as claimed in claim 1, said cross bearer guide means (6) being provided as hollow box profiles having a rectangular cross section, the cross bearer means (7) guided therein having a correspondingly shaped cross section.

9. An apparatus as claimed in claim 1, said second fluid pressure means (20) being connected between the cross bearer guide means (6) and the cross bearer means (7a, 7b).

10. An apparatus as claimed in claim 1, further comprising two wheel sets, one detachably mounted in the front and one to the rear of the machinery.

11. An apparatus as claimed in claim 1, further comprising lengthening pieces, said stationary skid means (3) and the cross bearer guide means (6) being selectively extensible by means of said lengthening pieces.

12. An apparatus as claimed in claim 1, said stepping skid means comprising at least four stepping skids, at least two of said stepping skids being disposed on opposite sides of said platform, said stepping skids being movable by means of said first fluid pressure means vertically alternatingly and in pairs which include at least one stepping skid on each side, said means to walk said platform rearwards and forwards comprising third fluid pressure means movably connecting said stepping skids to one of said cross bearer means to horizontally move said pairs of stepping skids relative to said platform.

References Cited

UNITED STATES PATENTS

| | | | |
|---|---|---|---|
| 2,777,528 | 1/1957 | Jourdain | 180—8 |
| 2,914,127 | 11/1959 | Ricouard | 180—8 |
| 2,935,309 | 5/1960 | McCarthy | 180—8 |
| 3,114,425 | 12/1963 | Adams | 180—8 |

LEO FRIAGLIA, Primary Examiner